July 12, 1938.  J. E. BEYER ET AL  2,123,839
STOCK PREPARATION METHOD
Filed March 5, 1936  2 Sheets-Sheet 1

INVENTORS
JAMES E. BEYER
AND
ELMER J. LEESMAN
BY Albert L. Ely
ATTORNEY

July 12, 1938.　　　　J. E. BEYER ET AL　　　　2,123,839
STOCK PREPARATION METHOD
Filed March 5, 1936　　　　2 Sheets-Sheet 2
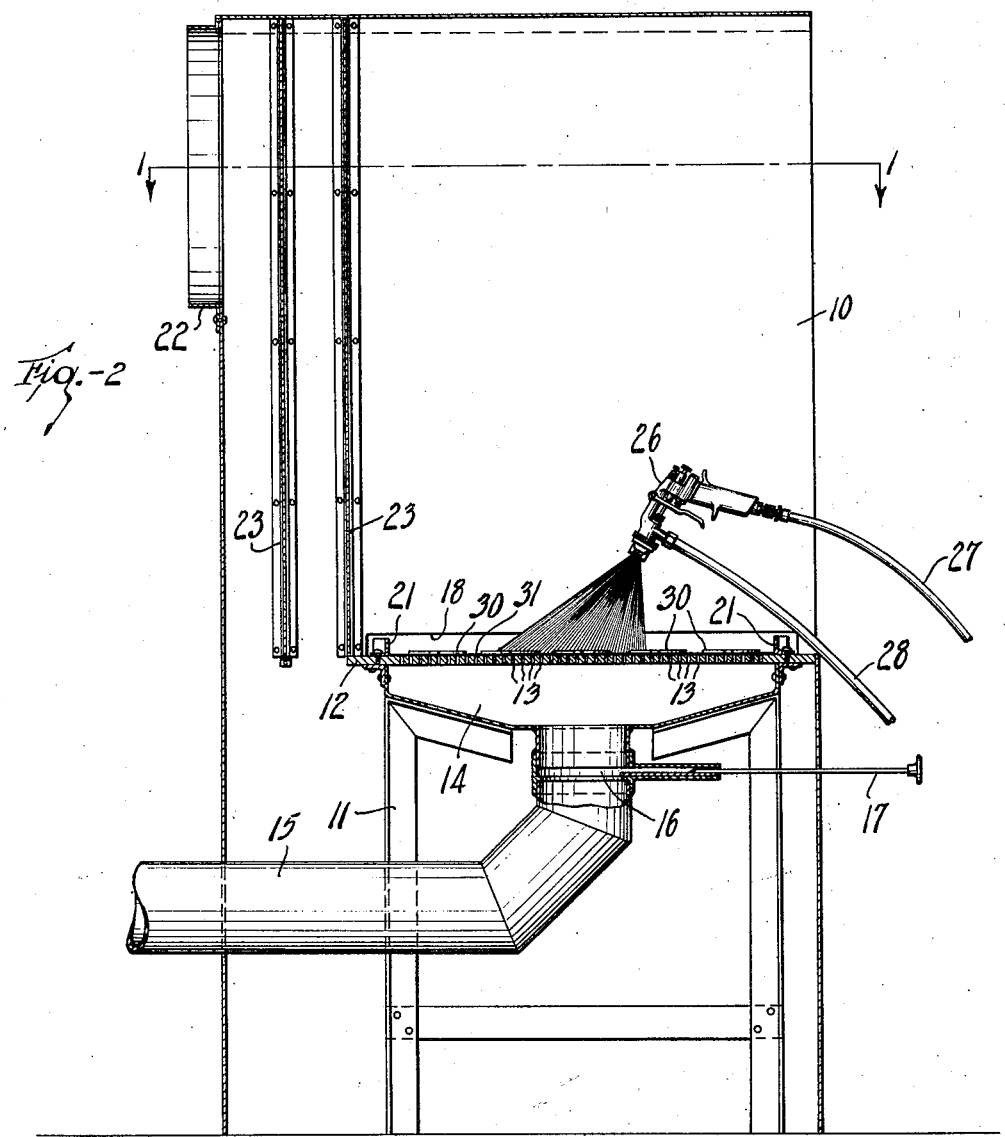
INVENTORS
JAMES E. BEYER
AND
ELMER J. LEESMAN
BY
ATTORNEY Patented July 12, 1938

2,123,839

UNITED STATES PATENT OFFICE 2,123,839

STOCK PREPARATION METHOD

James E. Beyer, Akron, and Elmer J. Leesman, Cincinnati, Ohio, assignors to The Firestone Tire & Rubber Company, Akron, Ohio, a corporation of Ohio Application March 5, 1936, Serial No. 67,270

1 Claim. (Cl. 12—147)

This invention relates to stock preparation methods and apparatus, and more especially it relates to procedure and apparatus for the treatment of small units of stock preparatory to the utilization of the units in the manufacture of articles.

In the illustrative embodiment of the invention herein shown, the stock to be treated consists of small, shaped leather blanks such as are used to cover the wooden heels of women's footwear. Before application to a wooden heel, blanks of the character mentioned require first to be mulled, and thereafter cemented. The mulling previously consisted of wetting the blanks by placing them on moistened flannel for a sufficient interval to render them soft, pliable and deformable, and then drying for 20 to 30 minutes before applying cement thereto. Mulling is best effected from the flesh side of the leather blanks, but this required that the blanks be turned over before cementing, so that the less effective method of mulling from the finished side of the leather usually was adopted. Furthermore, the problem of applying a thin, even coating of cement to the stock units has been present for many years.

The chief objects of the invention are to reduce the cost of preparing small units of stock before assembly; and to effect an even and uniform application of adhesive to the stock. More specifically the invention aims to combine mulling and cementing in a single operation. A further object is to provide a method and improved apparatus for achieving the foregoing objects. Other objects will be manifest as the specification proceeds.

Of the accompanying drawings:

Figure 2 is a section on the line 2—2 of Figure 1.

Figure 1:
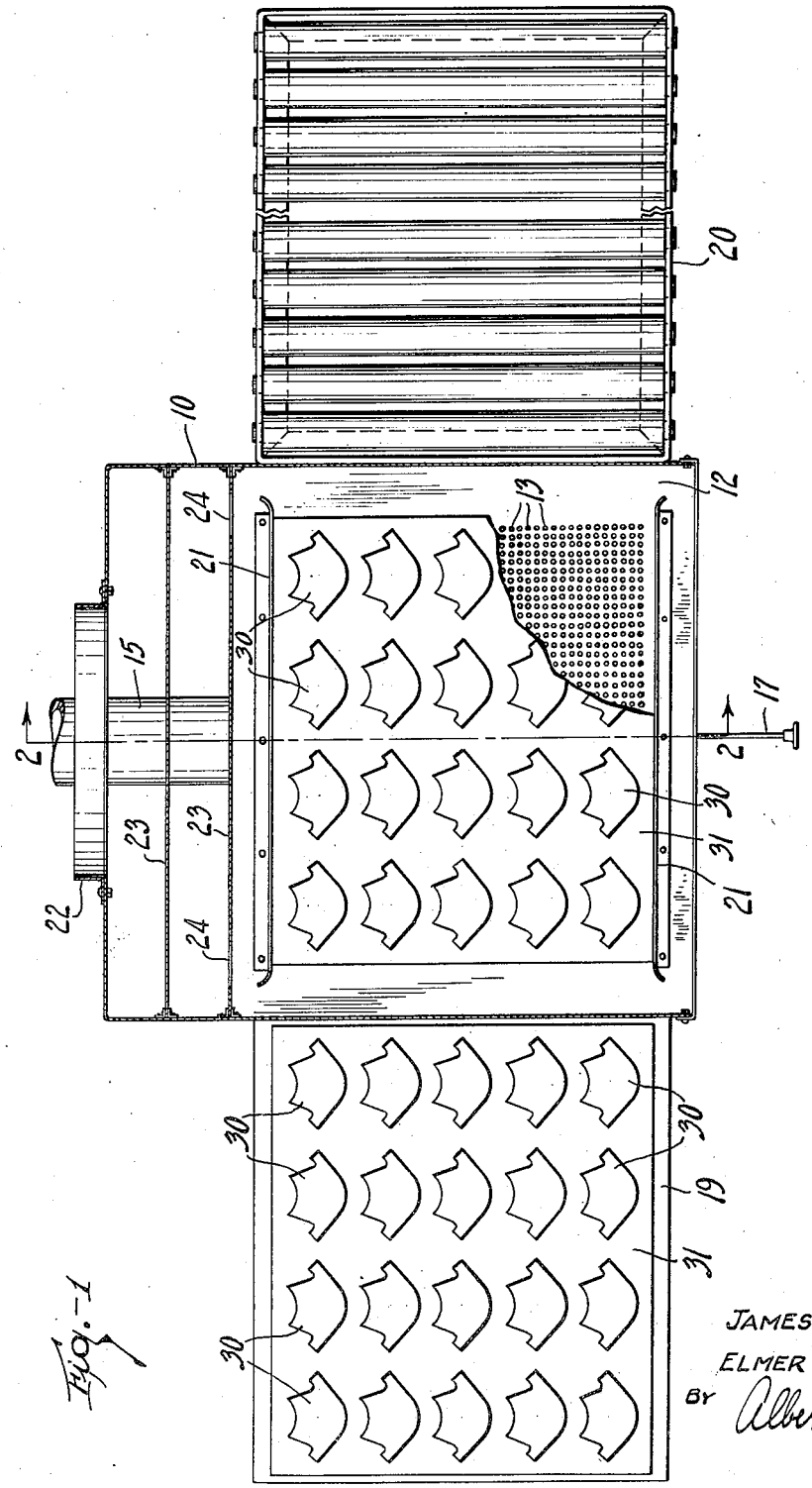
Figure 1 is a sectional plan view of apparatus embodying and adapted to carry out the invention, in its preferred form, said section being taken on the line 1—1 of Figure 2.

Briefly stated, the improved method of the invention consists in spraying the stock units with an adherent composition of rubber while retaining the units in proper position by means of suction, the rubber composition comprising a natural or artificial aqueous dispersion of rubber, preferably rubber latex.

Referring to the drawings, the apparatus for practising the aforesaid method comprises a booth 10 that is open at the front (the right as viewed in Fig. 2). Within said booth is a suction table 11 having a top 12 that has formed therein a multiplicity of apertures or perforations 13, 13. Below the table top 11 is a suction chamber 14 having communication through a pipe 15 with a suitable source of suction (not shown). A damper 16 in said pipe 15 is provided with an operating rod 17 that extends forwardly to the front of the booth. The respective sidewalls of the booth are formed with a horizontal slot, such as the slot 18, Fig. 2, at the level of the top of table-top 12, to permit work to be drawn onto the table through one side of the booth, and to be withdrawn therefrom through the opposite side of the booth.

At one side of the booth, exteriorly thereof, is a table 19 for supporting a batch of material to be treated in the booth, and at the opposite side of the latter is a gravity conveyor 20 upon which the treated material is removed to a remote point for succeeding operations. The table top 12 is provided at front and rear with respective guide flanges 21, 21 for facilitating the accurate positioning of the work upon the table top. Fumes that may arise during treatment of stock in the booth are removed therefrom through a vent pipe 22, which preferably is connected to an exhaust fan (not shown). In front of the vent opening are baffle plates 23, 23 that extend from the level of the table top 12 to the top of the booth, the front baffle plate being formed with a plurality of apertures 24, 24, as shown in Figure 1.

Adherent rubber composition is applied to the work units by spraying, and to this end there is provided a mobile spray-gun 26 that communicates, through flexible pipe 27, with a source of air under pressure (not shown), and is connected with a supply of fluent rubber composition (not shown) through a flexible pipe 28. The arrangement is such as to permit an operator standing at the open front of the booth to spray adhesive composition onto work units upon the table-top 12.

For illustrative purposes, the work units are shown herein as heel-cover blanks 30, 30 of leather. As is most clearly shown in Figure 1, a plurality of said blanks are concurrently treated in the apparatus shown, and to this end sheets of pervious or porous paper 31, 31 are provided upon which the plurality of blanks are arranged, the flesh sides of the blanks being uppermost.

In the practise of the improved method by means of the apparatus shown, the work-units 30 are assembled upon a pervious sheet 31 while the latter rests upon table 19. The work-batch is then drawn into the booth 10 through adjacent lateral slot 18 therein, and properly positioned upon table-top 12 between guide-flanges 21 thereon, in which position the sheet 31 completely overlies all of apertures 13 in said table-top. The operator then draws out rod 17 to open damper 16 in suction pipe 15 with the result that suction is applied to the porous sheet 31 and work-units 30 thereon and both are firmly held in position upon the table-top. An operator handling the spray-gun 26 then sprays the exposed faces of the work-units with rubber latex, the latter thus being applied in a thin, even film thereon. As soon as the spraying operation is completed, the operator shuts off the suction in the suction chamber 14 by pushing in damper-rod 17. This permits the sheet 31 with treated work-units thereon to be drawn off the table-top 12, passed through slot 18 at the delivery side of the booth, and placed upon gravity conveyor 20 which removes the work to a remote point. This completes a cycle of operation.

The use of aqueous dispersed rubber as an agglutinant is an important feature of the invention for the reason that the water in the dispersion soaks into the work-units and effects the mulling thereof without requiring a separate operation for this purpose. Since the mulling is effected from the flesh side of the leather there is no tendency to mar or destroy the finish on the other side of the leather. Furthermore there is no possibility of staining the finish of the leather since there is no petroleum base solvent in the latex. The use of a spray-gun for applying the latex assures a thin, even coating of the latter on the work, and the use of suction for holding the work-units in place against the force of the spray has the added advantage of expediting the drying of the latex after it is applied to the work.

By means of the method and apparatus described, material costs have been reduced 25% to 50% due to the fact that latex will cover approximately twice the area covered by an equal amount of naphtha cement, production has been accelerated 30% to 40% without additional labor, and the other advantages set out in the foregoing statement of objects have been achieved.

Although the invention is of especial utility for the preparation of leather heel-covers, it may be used advantageously for applying adhesive to other types of leather blanks, and to blanks composed of linen or cotton fabric.

Modification may be resorted to without departing from the spirit of the invention or the scope of the appended claim, which are not limited wholly to the specific construction shown or exact procedure described.

What is claimed is:

The method of concurrently mulling and agglutinating a leather stock blank which comprises mounting the blank, finished side down, locally upon a pervious sheet of paper, applying suction to the blank through said pervious sheet, spraying the flesh side of the blank with an aqueous dispersion of rubber, and subsequently removing the blank and rubber deposit thereon as a unit from the pervious sheet.

JAMES E. BEYER.
ELMER J. LEESMAN.